United States Patent Office 2,836,991
Patented June 3, 1958

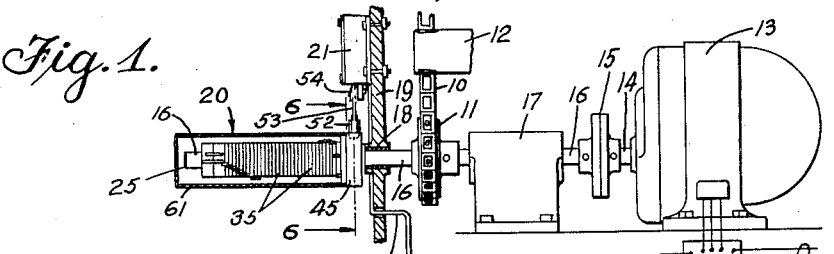

2,836,991

REVERSING MECHANISM

David B. Perlis, Sun Valley, Calif., assignor to Western Precipitation Corporation, Los Angeles, Calif., a corporation of California Application March 25, 1954, Serial No. 418,607

4 Claims. (Cl. 74—567)

This invention relates generally to reversing mechanisms and more particularly to improvements in such mechanisms for shifting a control member between two alternating positions at predetermined intervals of time or following a predetermined travel of a driven member.

The present reversing mechanism has been developed particularly for use in conjunction with a reversing or directional switch which in turn controls the direction of rotation of an electric motor. For purposes of disclosure, the invention is described in this typical relationship but without necessary limitation thereto since the elements of the reversing mechanism may be used in conjunction with other mechanical systems.

It is a primary object of my invention to provide a reversing mechanism that always operates at exactly the same intervals, measured as periods of time or as distances traveled by a moving member, and will continue to do so with the minimum possibility of losing its adjustment.

It is also an object of this invention to provide a reciprocating mechanism which automatically shifts a control member alternately back and forth at predetermined intervals and which is capable of being quickly and easily altered to change the intervals between shifts of the position of the control member.

A further object of my invention is to provide an improved arrangement of an electric motor and a motor reversing switch in which the direction of rotation of the motor is reversed periodically at precise intervals determined by a pre-established number of revolutions of a shaft driven by said motor.

A still further object of my invention is to provide a reversing mechanism of the character described which is capable of fine adjustment to obtain actuation at any desired fraction of a revolution of the motor driven shaft.

It is also an object of my invention to provide a reversing mechanism which is simple in manufacture and construction, reliable in operation and easy to adjust and maintain.

The above objects have been attained in a preferred form of my invention by mounting an oscillating cam concentrically of a rotating shaft, the cam being free to turn independently of the shaft. The cam engages a control member movable between two operating positions, the control member typically being the operating arm of a directional switch. At a position spaced from the cam, a collar or similar member is rigidly mounted on the shaft to turn therewith. Between the cam and the collar is plurality of rings which are individually rotatable with respect to the shaft. Mounted upon each one of the rings is an abutment which extends radially beyond the periphery of the ring and also axially beyond at least one side face of the ring for a distance not to exceed the axial dimension of the adjoining ring. All the rings are preferably of the same diameter and axial thickness. Similar abutments are mounted on the oscillating cam and on the fixed collar.

As the shaft rotates and carries with it the collar and attached abutment, during its first revolution the abutment engages the abutment on the adjoining ring and starts the ring rotating with the shaft. During the next revolution the abutment member on said adjoining ring engages the abutment member on the next ring away from the collar, causing this last ring to revolve. During each successive revolution, for a predetermined number of revolutions of the drive shaft, engagement is made with another abutment member in the series so that one more ring is caused to rotate until finally all the abutment members are in engagement and a driving connection is established between the collar and the oscillating cam. The completion of this driving connection transmits torque from the shaft to the cam which shifts the cam about the axis of the shaft; and this shifting movement of the cam shifts the position of the control arm to the alternate operating position.

In a typical and preferred arrangement, movement of the control arm opens one set of contacts and closes another set which, by changing the power supply to a reversible electric motor, causes a reversal in the direction of rotation of the motor which is drivingly connected to the shaft. At the end of a predetermined interval of time, the reversely rotating shaft in a similar manner causes a shift in the position of the oscillating cam so that the motor is restored to its original direction of rotation and the shaft is driven in its initial direction. The cycle is repeated at the end of any predetermined number of revolutions of the driven shaft. The shaft, by suitable means, drives a body over a linear path, reversal of the shaft causing a reversal in the direction of travel of the body. The length of the linear path is measured directly by the number of revolutions of the shaft.

In a preferred form, two similar collars are mounted on a shaft which are angularly movable to different adjusted positions with respect to each other. By this adjustment, a larger or smaller fraction of a revolution of a shaft is obtained in the total number of revolutions between each reversal of direction of shaft revolution.

Other objects and advantages of this invention will become apparent during the course of the following specification wherein the details of construction and mode of operation of a preferred embodiment of the invention are described with reference to the accompanying drawing, in which:

Fig. 1 is a side elevational view showing schematically an arrangement of a reversing electric motor for driving a chain and connected to my novel reversing mechanism which actuates a switch in the control circuit for the motor for periodically reversing the direction of movement of the motor and chain, according to the invention;

Fig. 2 is a side elevational view of the reversing mechanism on an enlarged scale with the outer casing cut away to expose the operating parts for counting turns of the drive shaft;

Fig. 3, 4 and 5 are transverse sectional views taken respectively on lines 3—3, 4—4, and 5—5 of Fig. 2; and Fig. 6 is a fragmentary elevation and transverse section taken substantially on line 6—6 of Fig. 1.

Referring to the drawing, the invention is illustrated in an arrangement for moving a chain 10 about a pair of vertically spaced apart sprocket wheels, the lower wheel of said pair being designated by numeral 11. The upper sprocket is not shown, but is similar. I have chosen to illustrate the invention in the arrangement shown since it is typical of how my invention has been successfully employed. A typical installation previous to my invention operated in a way requiring parts to travel back and forth between two spaced limit switches for periodically reversing the direction of rotation of a motor drivingly connected to the chain. The particular installation just referred to included a linearly moving body or carriage, which in the drawing is generally indicated at 12, and is arranged to be carried back and forth by the chain over a vertical path of substantial height. In that conventional installation the two contact switches were located one at each end of the path travelled by the carriage 12, where they were not conveniently accessible to an operator for adjustment or maintenance and were exposed so that some times in a short time they became covered with dust and dirt and did not function properly. Contrasted to that arrangement is the illustrated arrangement according to the present invention and in which all the several elements for driving the chain and carriage and for controlling the direction of travel of the chain and carriage are conveniently accessible in a compact assembly. The reversing mechanism is removed from inside the housing 19 enclosing carriage 12 to a position outside the housing where it is easily accessible for adjustment and service.

In the apparatus illustrated in Fig. 1, a reversible gearhead electric motor 13 is shown with its driving shaft 14 attached to one side of a conventional type coupling 15, which in turn is connected to one end of an extension shaft 16. Drive shaft 16 extends through and is journalled in a suitable supporting bearing 17 and carries the sprocket wheel 11 which is keyed or otherwise suitably secured on the shaft so as to be rotated by the shaft for driving the roller chain 10 which passes around the sprocket. Chain 10 is connected to carriage 12 which is reciprocated by the chain over a linear path. Beyond sprocket 11, the shaft 16 extends through a bearing sleeve 18 in housing wall 19 and carries on its projecting end the revolution counter and reversing mechanism designated generally by numeral 20 and which is designed to impart movement to an associated member as will be described. There is a directional or reversing electric switch 21 mounted on the wall 19 at a location adjacent the counter and reversing mechanism 20. The switch 21 is connected to a source of electric power and to a suitable relay 23 by cable 22. Relay 23 may be of the type commonly known as a reversing motor starter and is in series with motor 13 which receives power from a 3-phase source as represented by wires 24.

As seen in Fig. 2, the several elements comprising the reversing mechanism 20 are supported on a portion of the extension shaft 16. Adjacent the outermost end 25 of the shaft is a collar member 26 having a radially directed set screw 27 therein for fixing the collar at a desired position on the shaft so as to cause the collar to be rotated by and with the shaft. The collar 26 carries an abutment in the form of rod 28 which is firmly secured to the periphery of the collar by any suitable means, for example by solder indicated at 29. Rod 28 extends in a direction parallel to the axis of the shaft 16 and beyond the face 30 of the collar. Positioned on the shaft inwardly of and adjacent to collar 26 is another collar member 31 which is preferably similar in construction to the collar 26. Collar 31 has a set screw 32 and an axially directed rod 33 provides an abutment on the collar. All parts are like their corresponding elements on the collar 26. Though the collars 26 and 31 of the embodiment illustrated in the drawing are identical in construction they need not, of course, be so made; however they are preferably made alike in order to provide for interchangeability of collars in a single counter or with collars for other similarly constructed counters. It is important to note that the collar 31 is arranged on the shaft 16 in a reversed position to that of the collar 26 whereby the projecting end of rod 28 on collar 26 extends over the collar 31 and the projecting end of rod 33 extends over the collar 26, in a direction outwardly toward the end 25 of the shaft. However, as will become apparent, it is unnecessary to operation of the mechanism for rod 33 to be longer than the axial dimension of collar 31.

Shaft 16 carries a plurality of annular members or rings arranged in an axially extending series and generally indicated at 35. The series of members 35 extends inwardly on the shaft from the collar member 31. The rings are preferably made identical to each other for simplicity and ease of manufacture, and therefore a description of one of them will be equally applicable to any other one of them. Thus, the typical ring 35a shown in Fig. 4, has flat, parallel side faces and an axial bore which is slightly larger in diameter than the shaft 16 whereby the ring is free to rotate relative to the shaft. Ring 35a has an axially directed projection 37 in the form of a short pin suitably secured to the ring on its periphery and projecting beyond the side face of the ring at one side only. In this case pin 37 projects beyond the ring toward collar 27 and the outer end 25 of shaft 16 for a distance not to exceed the radial thickness of the adjoining ring.

The end ring of the series 35 is adjacent collar 31 and is designated at 35b. It is like all other rings except that its projecting portion 37b engages rod 28 on collar 27 or rod 33 on collar 31 depending upon the direction of rotation of the shaft 16 and the collars. When shaft 16 is rotated in the direction indicated by arrow 39 in Fig. 2, or counter-clockwise in Fig. 4, the projecting end of rod 28 engages pin 37b along one side thereof as in Fig. 2, and thereby causes the ring 35b to rotate along with the collars in the direction of arrow 39. When the direction of the drive shaft rotation is reversed, i. e. rotated in a direction opposite to that of arrow 39 or clockwise in Fig. 4, rod 33 on the collar 31 engages pin 37b at its opposite side and causes the ring 35 to be rotated in such reverse direction. The projecting portion of rod 33 that overlaps collar 27 does not assist in any way in imparting rotation to the ring, but, as explained above, the rod 33 is made of a length equal to that of the rod 28 solely for the purpose of making the collars 31 and 26 interchangeable.

Proceeding now to that ring which is next in line and in the drawing is designated by numeral 35c, it adjoins ring 35b and has a peripheral pin 37c projecting radially beyond the periphery of the ring 35b to provide an abutment whereby one side of the pin 37c is engaged by the pin 37b on ring 35b when the latter ring is rotated in one direction, and the opposite side of the pin 37c becomes engaged by the pin 37b when the direction of rotation of the ring 35b is reversed. Thus it is seen that immediately upon reversing the direction of rotation of ring 35b, its pin 37b must travel a full circle with respect to the ring 35b, less the angle subtended by the thickness of pin 37c, before the pin 37b again engages pin 37c at the opposite side. In the design shown this distance amounts to 360° less about 10° or a net travel of about 350° between disengagement of pins 37b and 37c and their reengagement. In like manner the pin on each successive ring engages the pin on the ring next to it, first on one side of the latter pin and then on its opposite side following each reversal of direction of rotation of the shaft 16.

The innermost ring 35d is next to cam member 45. The cam 45 comprises an annular member loosely mounted on shaft 16 to permit the shaft to rotate freely in an axial bore 46 in the cam. The cam remains still except when it is moved by the ring 35d. Projecting axially of shaft 16 from an outside face 47 on the cam is a pin 48 which extends over the periphery of the ring 35d so as to become engaged by a projecting pin 37d on the ring 35d whereby when the ring 35d is driven by the ring next to it, it moves the cam.

There is a notch 51 formed as an indentation in the periphery of the cam. Notch 51 receives roller 52 on the lower end of a control arm 53 which in turn is pivotably mounted at 54 to a lug 55 on the housing of a conventional type of two-position directional switch 21. The inner end of the arm 53 extends into the switch housing and is movable between two sets of contacts (not shown) in the switch operable to actuate reversing motor starter 23 in a manner to connect the motor 13 to its supply conductors 24 for rotating the motor in a selected direction. As the construction of a suitable switch at 21 and relay 23 and the manner in which these elements are electrically connected to a motor for reversing the direction of rotation of the motor are well understood by those skilled in the art and do not themselves constitute a part of the present invention, it is considered unnecessary to the purpose of this disclosure to describe them in greater detail. Suffice to point out that when the control arm 53 is in the full-line position shown in Fig. 6, its inner end closes one set of contacts in the switch 21 causing the motor to be rotated in one direction, and when the arm is shifted by the cam 52 in a direction indicated by arrow 56 to an alternate position at 53a the arm closes other contacts in the switch which cause relay 23 to reverse the direction of rotation of the motor.

In assembling the revolution counter 20 on the shaft 16, the cam 45 is first placed over the end of the shaft 16 and moved inwardly from the end of the shaft to a position against a washer 59 of felt or other suitable material which excludes dirt from bearing 18. The washer 59 spaces the cam from a hub 60 on housing 19 which holds the bearing sleeve 18 through which the shaft extends. After placing roller 52 on the control arm 53 in cam notch 51, any desired number of rings 35 is placed on the shaft with their axially projecting portions 37 all extending toward the outer end 25 of the shaft. The collars 31 and 26 are then placed over the end of the drive shaft fastened on the shaft, as shown, by their respective set screws 32 and 27 at a position which leaves each of the rings free from tight contact against the faces of its adjoining rings.

Individual ones of rings 35 are free to turn relative to shaft 16 so that they are rotated operationally only by engagement with the projecting portion 37 of an adjoining ring. Since there should not be any appreciable clearance between successive rings, there is normally a light frictional drag between adjoining rings that may make them revolve more or less at irregular intervals; but this does not change their basic operational movement as described below.

A suitable cover 61 is finally placed over the assembly of rings 35 and the inner end of the cover is secured to cam 45 as by screws 62.

Operation of the mechanism is as follows: With the motor at rest, an operator closes a conventional start-stop switch (not shown) to start the motor. Reversing switch 21 may be in either position so shaft 16 may initially rotate in either direction; but for convenience of description let it be assumed that the motor starts to rotate the shaft in the direction of arrow 39. The collars 26 and 31 both being fixed to the shaft, rotate along with the shaft. Neglecting frictional drag on the side faces of the rings, assume now that the first ring 35b and each successive ring does not initially rotate with the shaft. Rod 28 on collar 26, prior to being turned a full revolution engages one side of the projection 37b on the ring 35b as in Fig. 2, thereby imparting rotation to the ring 35b in the direction of arrow 39. The pin 37b continues on around and engages its next adjacent pin 37c at some time prior to completing its first full turn. Pin 37c will then prior to its first full revolution engage the next adjacent pin to the right; and in turn each ring starts to rotate in succession to the right in Fig. 2. Such successive engagement of adjacent projections or pins continues until the last ring 35d is rotated to a position where its pin 37d engages pin 48 on the cam 45. At this instant, a firm driving connection is established between collar 27 and cam 45 through rod 28 and the series of pins 37 so that power is transmitted from shaft 16 to cam 45 that causes the cam to be turned in the direction of arrow 39 thereby swinging the control arm 53 about its pivot 54 as shown by arrow 56.

When the control arm is moved, it opens one set of electrical contacts in the switch 21 and closes another. Switch 21 is preferably one having a toggle action so that when arm 53 is moved past center in either direction it snaps forward to complete the movement. This movement may rotate cam 45 faster than shaft 16 is turning, but the cam is able to advance more rapidly if necessary. Ordinarily motor 13 reverses so rapidly that cam 45 does not over travel the position occupied when notch 51 is at 51a and arm 53 has moved to the alternate position 53a in which the inner end of the arm closes a second set of contacts in the switch. Closing said second set of contacts actuates relay 23 in a conventional manner to cause a reversal in the direction of rotation of the motor.

It is to be understood that relay 23 is introduced in the motor control circuit as a matter of practical convenience, and that switch 21 may directly effect reversal of motor 13. In either case switch arm 53 has forward and reverse operating positions. Switch 21 is referred to as a reversing switch in a broad sense since it in either case initiates the action required to reverse the direction of rotation of motor 13 and shaft 16.

When the motor reverses its direction of rotation and the direction of rotation of the shaft 16, collars 26 and 31 are rotated in a direction opposite to that of the arrow 39 whereupon the rod 33 engages pin 37b at the side opposite to that previously engaged by the rod 28. Ring 35b is thus revolved in the opposite direction and in its turn engages the adjoining pin 37c at the side opposite that previously engaged. This reversal of rotation continues from one ring to the next until a new firm driving connection is established between collar 31 and cam 45 through the series of pins 37. Power from shaft 16 is transmitted through this driving connection to cam 45 to restore the cam again to its initial starting position. The cam shifts the switch arm back to the first position to close the first contacts and to again reverse the direction of the motor. The original direction of rotation is now restored and the full cycle of operation as just described will be repeated.

In actual practice, the rings 35 do not remain still but instead they are irregularly rotated by the shaft as a result of frictional engagement between them. Such rotation of the rings does not, however, change the number of revolutions that is required to be made by the collars before they can impart rotation through the series of rings and pins to the cam. Even though groups of adjacent rings may gang up during the period of rotation of the shaft in a given direction, the cam is not moved until each ring has made a substantially complete revolution with respect to the ring adjacent its inner face. Each revolution of a given ring between successive pin engagements is, of course, shorter than 360° by an amount equivalent to the thickness of the pin carried by that ring. The number of revolutions of the shaft between each successive reversal thereof is determined by the number of rings placed on the shaft and is approximately equal to the number of rings. To change the number of rings on the shaft and thereby the number of revolutions between reversals, an operator need merely remove the collars from the end of the shaft and then remove a desired number of rings or add additional rings.

The several pins and rods contained in the revolution counter constitute abutment means for engagement of adjacent abutment means on rings and collars and for engagement with the cam. Each has two contact surfaces, and is supported at the same fixed radius from the axis of the drive shaft. Should the contact surfaces on a ring, for example, be spaced wider apart in annular distance around the axis of ring than in the form described above, as would be the case, for example, wherein the pins are formed of wide bars, a greater number of rings will be required to provide a given number of shaft revolutions. This is because a lesser arc is turned by each abutment between successive engagements with adjoining abutments.

Fine adjustment to obtain any selected fraction of a revolution is made possible by angular adjustment of the two collars on the shaft. Should it be desired to shorten the period between successive reversals of the shaft by a fraction of one revolution the collars may be adjusted on the shaft to space their respective rods 28 and 33 further apart than is illustrated in the drawing. More specifically, collar 31 is turned clockwise, viewed as in Fig. 4, to decrease the arcuate distance travelled by pin 37b after disengaging rod 28 to engage pin 33. Likewise, should it be desired to increase such period by a fraction of one revolution the collars may be adjusted to bring their rods closer together than shown to increase the designated travel of pin 37b.

Collars 26 and 31 may be considered as two halves of a single collar but so designed as to increase or decrease at will the distance between the two contact faces of a single abutment. Hence it is evident that if no need exists for adjustment to a variable fraction of a revolution, a single collar with a single fixed abutment of suitable arcuate length may be used, or the two rods 28 and 33 can be mounted on a single collar, for example, collar 31.

It is to be understood that the form of my invention herein shown and described, is to be taken as an illustrative example of the same, and that various changes may be resorted to, without departing from the spirit of my invention or the scope of the appended claims.

I claim:

1. The combination comprising: a rotatable drive shaft; a collar fixed on said shaft; cam means supported on said shaft at a position spaced from the collar; a control arm; a support for said control arm, said arm being pivotally mounted on said support, and being engageable with said cam means and holding said cam means against direct rotation by said shaft; a plurality of rings arranged in an axially directed series on said shaft between said collar and said cam means, said shaft being rotatable relative to said rings, said rings being substantially of equal outer diameter, each of said rings having abutment means projecting radially outwardly from the periphery thereof and also extending in an axial direction from the ring but not beyond an adjacent ring, said collar having similar abutment means engageable with the ring adjacent thereto, and said cam means having abutment means engageable with the ring adjacent thereto.

2. Switch operating mechanism comprising: a rotating shaft; a switch control arm movable between a first and a second operating positions; an arm shifting cam mounted concentrically of the shaft and engaging the control arm; a plurality of abutments disposed in a series extending axially of the shaft, the last abutment at one end of the series being attached to the oscillating cam; means rigidly mounting the last abutment at the other end of the series on the shaft to rotate therewith; and means mounting the intervening abutments at fixed radial distances from the shaft axis to rotate about the shaft axis and in positions in which each of said intervening abutments is engageable with the adjoining abutment at each side to establish periodically a firm driving connection between the two end abutments of the series to shift said cam angularly about said shaft.

3. The combination as in claim 1 that also includes a second collar adjoining the first mentioned collar and independently fixed to said drive shaft, the second collar also having abutment means engageable with the abutment means on said ring adjacent the first mentioned collar whereby relative angular movement of the two collars provides adjustment for a fractional part of a revolution of the shaft between successive movements of said control arm.

4. The combination as in claim 1 that also includes an elongate housing mounted at one end on the cam means and enclosing the collar and the intervening rings.

References Cited in the file of this patent

UNITED STATES PATENTS

| | | |
|---|---|---|
| 1,316,093 | Henrice | Sept. 16, 1919 |
| 1,514,881 | Van Norman | Nov. 11, 1924 |
| 1,699,785 | Geiger et al. | Jan. 22, 1929 |
| 1,861,245 | Smith | May 31, 1932 |